United States Patent
Mack et al.

(10) Patent No.: US 8,734,031 B2
(45) Date of Patent: May 27, 2014

(54) CAMERA BARREL MECHANISM

(71) Applicant: Qwest Communications International Inc., Denver, CO (US)

(72) Inventors: Adam Mack, Menlo Park, CA (US); James Yurchenco, Palo Alto, CA (US); Matthew Robert Adams, Mountain View, CA (US); Adam Vollmer, San Francisco, CA (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 13/722,884

(22) Filed: Dec. 20, 2012

(65) Prior Publication Data
US 2013/0163977 A1 Jun. 27, 2013

Related U.S. Application Data

(60) Provisional application No. 61/579,863, filed on Dec. 23, 2011.

(51) Int. Cl.
*G03B 17/00* (2006.01)
*G03B 17/02* (2006.01)

(52) U.S. Cl.
USPC .......................................... 396/428; 396/535

(58) Field of Classification Search
USPC .......... 396/419, 427–429, 535; 348/373, 374, 348/376; 359/815; 455/556.1, 575.1
See application file for complete search history.

(56) References Cited

U.S. PATENT DOCUMENTS 7,324,152 B2 * 1/2008 Yoon .............................. 348/360
2011/0276885 A1 11/2011 Gibson et al.

OTHER PUBLICATIONS

U.S. Appl. No. 13/722,896, filed Dec. 20, 2012, 48 pages.

* cited by examiner

*Primary Examiner* — W B Perkey
*Assistant Examiner* — Minh Phan
(74) *Attorney, Agent, or Firm* — Swanson & Bratschun, L.L.C.

(57) ABSTRACT

Novel tools and techniques are described for protecting camera components on a surface and/or within an internal portion of a portable electronic device. In one aspect, an electronic device might comprise a camera mount, which might comprise a camera barrel assembly configured to have a camera affixed thereto, the camera barrel assembly being rotatably coupled with one of a front panel, a rear panel, or a chassis of the electronic device. The camera mount may further comprise a set of cantilever springs affixed to one of the front panel, the rear panel, or the chassis and biased against the camera barrel assembly to provide rotational friction on the camera barrel assembly. The set of cantilever springs might have sufficient compliance to allow the camera to retract into a body of the portable electronic device upon encountering an external force, which may include an impact force or a dropping force.

17 Claims, 8 Drawing Sheets

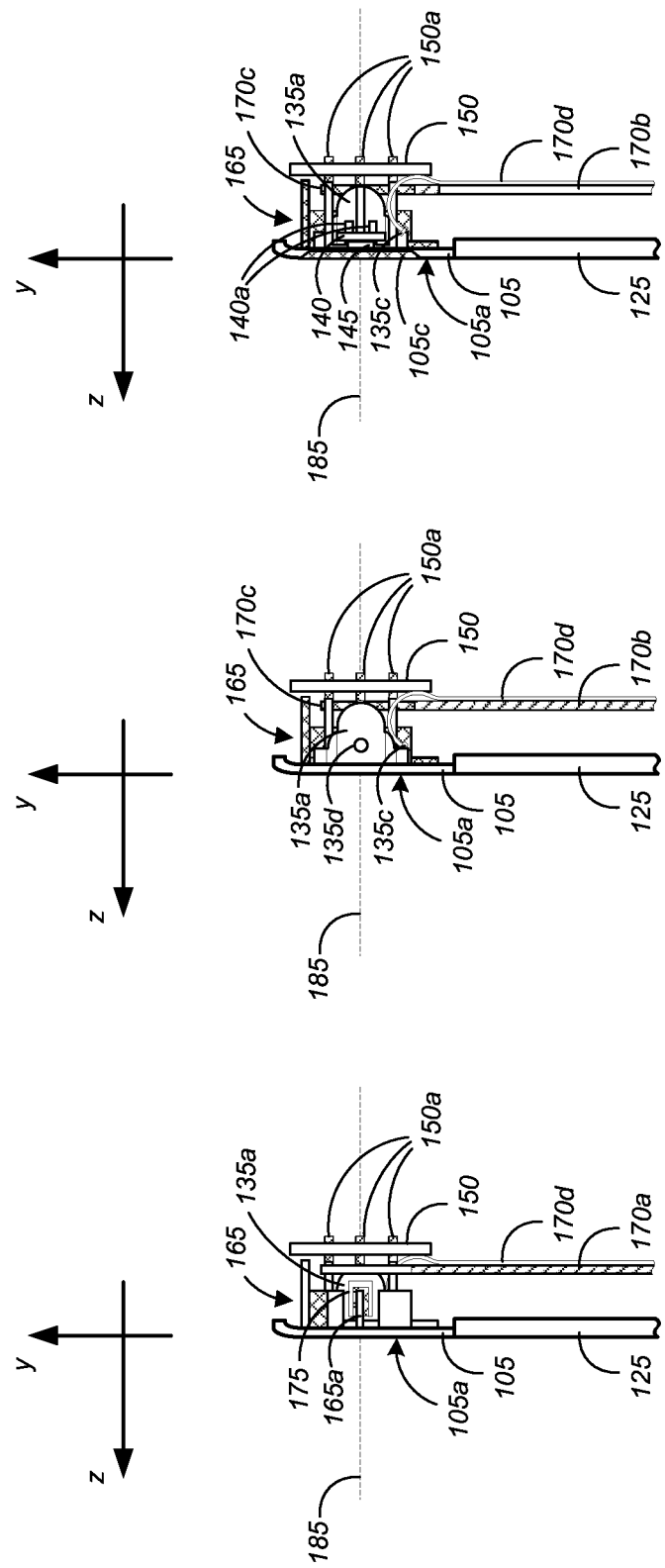

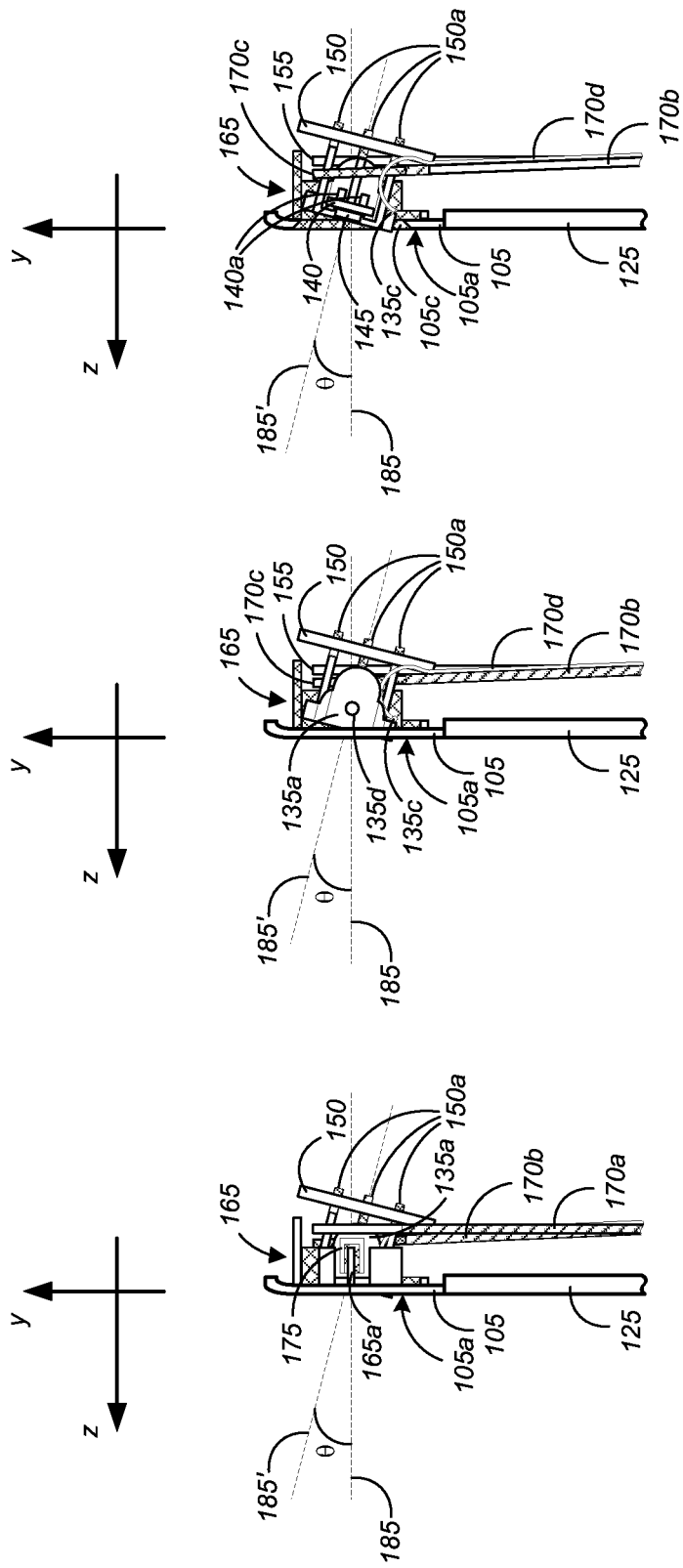

CAMERA BARREL MECHANISM

CROSS-REFERENCES TO RELATED APPLICATIONS

This application claims priority to U.S. Provisional Patent Application No. 61/579,863, filed on Dec. 23, 2011, by Mack et al. and titled, "CAMERA BARREL MECHANISM", which is hereby incorporated by reference, as if set forth in full in this document, for all purposes.

The present disclosure may also be related to the following commonly assigned application(s)/patent(s):

U.S. patent application Ser. No. 12/773,742, filed on May 4, 2010 by Gibson et al. and titled, "Multi-Client Local Network Base Station" (published as US PG Pub. No. 2011/0276885 A1 on Nov. 10, 2011) (hereinafter, the "'742 Application"), which is incorporated herein by reference in its entirety; and U.S. patent application Ser. No. 13/722,896 filed on a date even herewith by Mack et al. and titled "Elastomeric Chassis Suspension for Electronic Devices", which claims priority to provisional U.S. patent application Ser. No. 61/579,880, filed on Dec. 23, 2011, both of which are incorporated by reference herein in their entirety.

The respective disclosures of these applications/patents are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to mechanisms for protecting camera components within and on a surface of portable electronic devices, and more particularly, to a camera barrel mechanism for electronic devices.

BACKGROUND

Traditionally, electronic devices, particularly portable electronic devices having a built-in camera (portions of which might extend beyond the housing of the devices), have been constructed to be as compact as the components within might allow. This approach saves costs, while allowing the electronic devices to be less bulky, and thus less cumbersome for a consumer to carry or otherwise transport. As a result, most portable electronic devices having such features lack mechanisms therein that protect internal and/or external camera components from impacts, e.g., due to daily handling, drops, collisions with other objects, etc. Such impacts may damage camera components on a surface of a portable electronic device, and/or may damage electronics components of the camera that are housed within the portable electronic device.

The embodiments disclosed herein are directed toward overcoming one or more of the problems discussed above.

BRIEF SUMMARY

Various embodiments provide tools and techniques to enable protection of camera components on a surface and/or within an internal portion of portable electronic devices from impacts due to external forces (e.g., daily handling, drops, collisions with other objects, etc.).

In one aspect, a camera mount might comprise a camera barrel assembly and a set of cantilever springs. The camera barrel assembly might be configured to have a camera affixed thereto. In some cases, the camera barrel assembly might be rotatably coupled with one of a front panel, a rear panel, or a chassis of a tablet computer system so that the camera may be disposed with an aperture of the camera facing external to the tablet computer system and generally normal to a face of the tablet computer system. The set of cantilever springs might be affixed to one of the front panel, the rear panel, or the chassis of the tablet computer system, and may be biased against the camera barrel assembly to provide rotational friction on the camera barrel assembly. In some embodiments, the set of cantilever springs might have sufficient compliance to allow the camera to retract into a body of the tablet computer system upon impact to a face of the camera.

In another aspect, a portable electronic device might comprise a camera mount, which may comprise a camera barrel assembly and a set of cantilever springs. The camera barrel assembly might be configured to have a camera affixed thereto. In some embodiments, the camera barrel assembly might be rotatably coupled with one of a front panel, a rear panel, or a chassis of the portable electronic device, wherein in an unrotated state, the camera barrel assembly might be rotated so that the camera may be disposed with an aperture of the camera facing external to the portable electronic device and generally normal to a face of the portable electronic device. The set of cantilever springs might be affixed to one of the front panel, the rear panel, or the chassis of the portable electronic device, and may be biased against the camera barrel assembly to provide rotational friction on the camera barrel assembly. The set of cantilever springs, according to some embodiments, might have sufficient compliance to allow the camera to retract into a body of the portable electronic device upon encountering an external force. In some embodiments, the external force may include one of a force resulting from the portable electronic device being dropped or a force of impact to one of a face of the camera, a face of the camera barrel assembly, or a face of the portable electronic device.

In some embodiments, the set of cantilever springs having sufficient compliance to allow the camera to retract into a body of the portable electronic device may include one or more cantilever springs of the set of cantilever springs having sufficient compliance to rotate the camera barrel assembly and the camera to the unrotated state of the camera barrel assembly. In other embodiments, the set of cantilever springs having sufficient compliance to allow the camera to retract into a body of the portable electronic device may include one or more cantilever springs of the set of cantilever springs having sufficient compliance to translate the camera barrel assembly and the camera to a position within the body of the portable electronic device.

In yet another aspect, a camera mount might comprise a camera barrel assembly and a set of cantilever springs. The camera barrel assembly might be configured to have a camera affixed thereto. In some cases, the camera barrel assembly might be rotatably coupled with one of a front panel, a rear panel, or a chassis of an enclosure so that the camera is disposed with an aperture facing external to the enclosure. The set of cantilever springs might be affixed to the chassis of the enclosure, and may be biased against the camera barrel assembly.

In another aspect, a method might comprise providing one of the camera mounts described above within a portable electronic device. The method may further comprise flexing, in response to encountering the external force, at least one spring of the set of cantilever springs from a flexed state to an unflexed state; and rotating, in response to flexing the at least one spring of the set of cantilever springs from the flexed state to the unflexed state, the camera barrel assembly about at least one of a first axis and a second axis from a rotated state to the unrotated state. The second axis may be orthogonal to the first axis. In some embodiments, the method may further comprise rotating the camera barrel assembly from the unrotated state to the rotated state, about the at least one of the first axis and the second axis; and flexing, in response to rotating the camera barrel assembly from the unrotated state to the rotated state, the at least one spring of the set of cantilever springs from the unflexed state to the flexed state.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. In some instances, various shaded portions (including hatchings, cross-hatchings, and the like) may denote depth-wise differences between adjacent surfaces/components and/or may denote different surfaces/components that abut or are near each other.

FIGS. 4A-4C are partial sectional views of an example of a camera barrel mechanism that is mounted on the rear portion of a front panel of a portable electronic device, in accordance with various embodiments.

FIGS. 5A-5C and 6A-6C are partial sectional views of an example of a camera barrel mechanism that is rotated with respect to a front panel of a portable electronic device, in accordance with various embodiments.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 2:
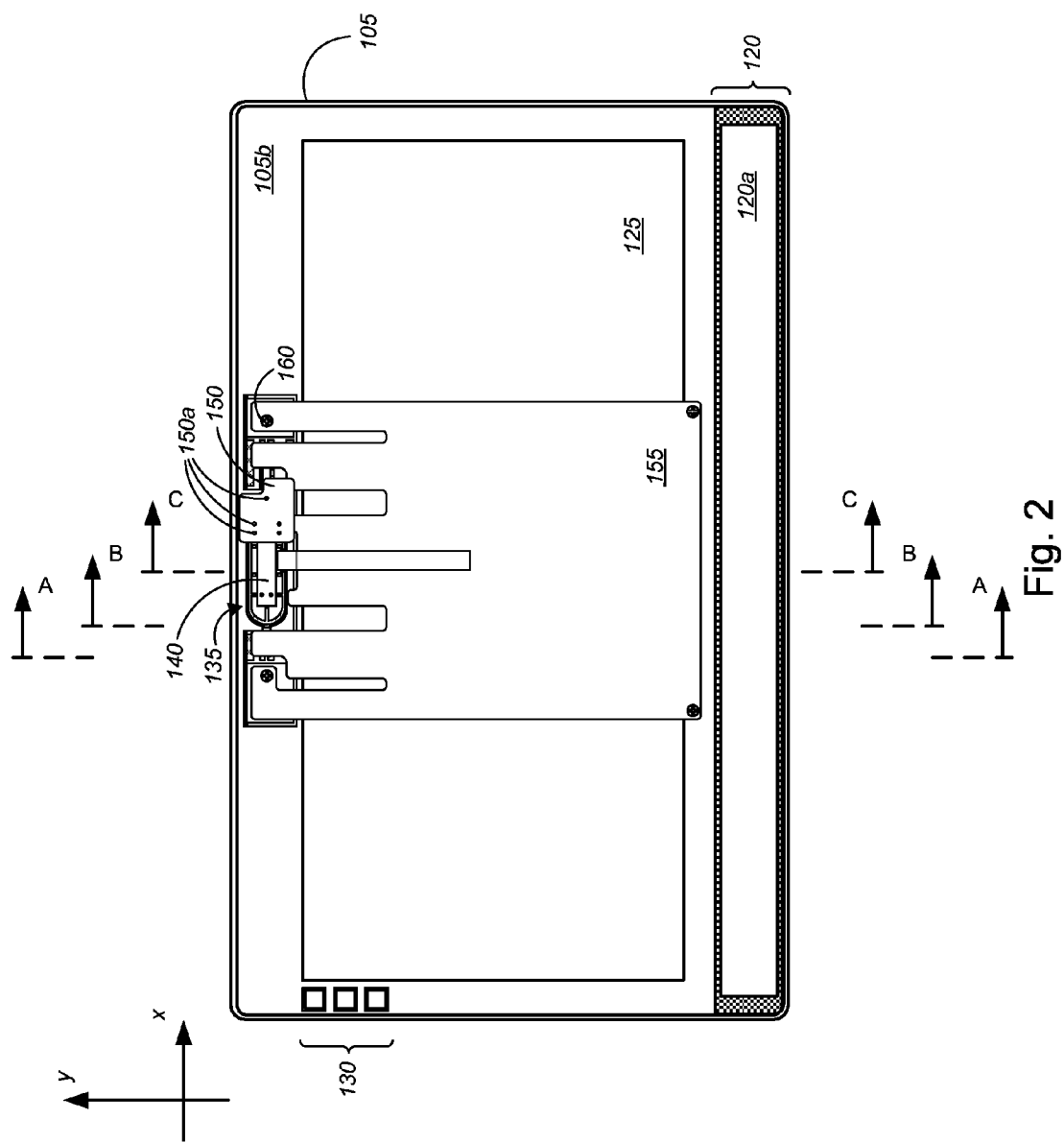
FIG. 2 is a rear plan view of an example of a front panel of a portable electronic device, in accordance with various embodiments.
Figure 3A:
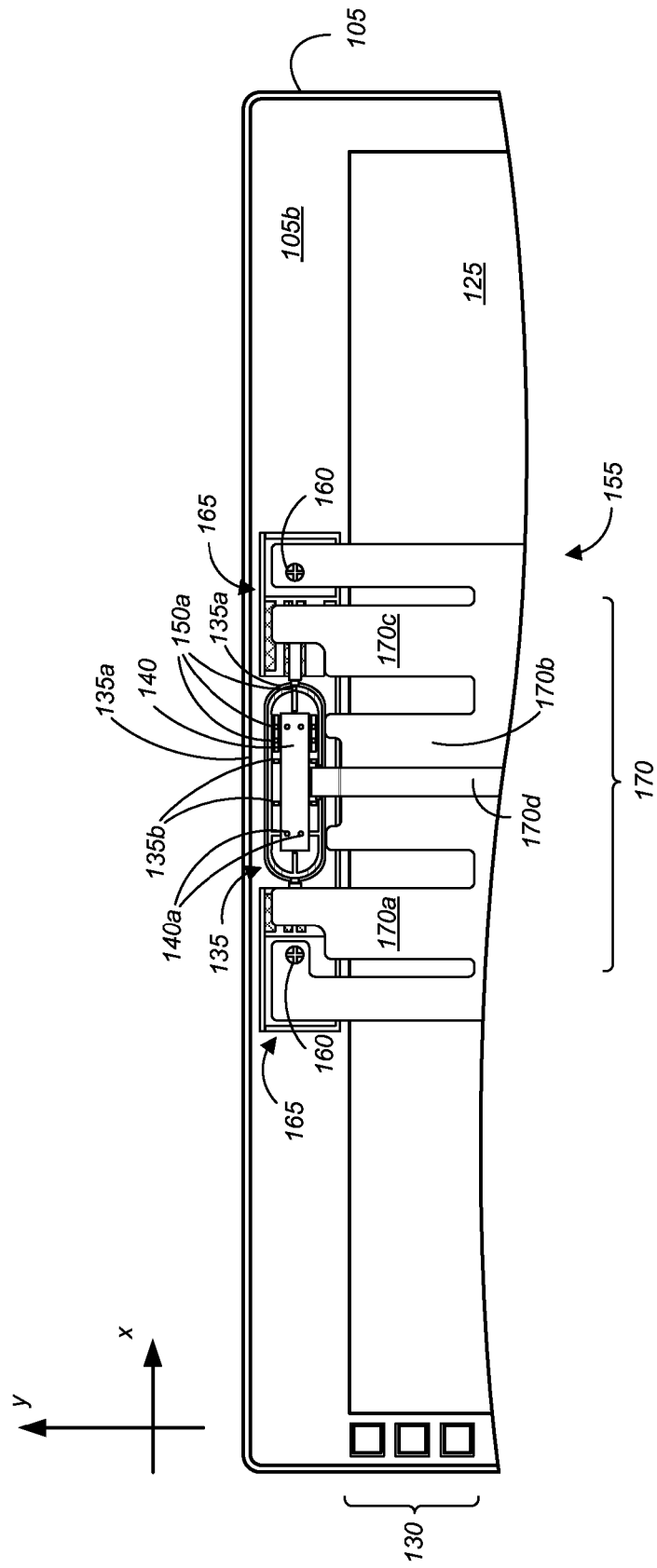
FIG. 3A is a partial rear plan view of an example of a front panel of a portable electronic device, without an actuating plate of a camera barrel mechanism, in accordance with various embodiments.

Herein, the terms "spring suspension frame," "spring suspension panel," "suspension frame," "suspension panel," and the like are interchangeable, and refer to the panel or frame from which portions are cut out or machined out to form cantilever springs (as shown, e.g., in FIGS. 2 and 3A). Similarly, "camera barrel mechanism" and "camera barrel assembly" may be interchangeable, and may refer to a structure that allows rotation and/or translation of a camera mounted thereon, relative to a front panel, a rear panel, or a chassis of an electronic device in which the "camera barrel mechanism" or "camera barrel assembly" is mounted.

A set of embodiments provides novel camera barrel mechanisms or assemblies. One embodiment can be employed in a laptop computer, a tablet computer or similar device. Another embodiment can be employed in a telephone handset, a mobile telephone, a mobile smart phone, or similar device. Merely by way of example, the '742 Application describes a number of communication systems, including tablet systems and handset systems, any (or all) of which can employ various embodiments of the camera barrel mechanism described herein. These camera barrel mechanisms or assemblies, as an example, can also be implemented in conjunction with the chassis suspension solutions described in U.S. patent application Ser. No. 13/722,896 filed on a date even herewith by Mack et al. and titled "Elastomeric Chassis Suspension for Electronic Devices" which claims priority to provisional U.S. Patent Application No. 61/579,880, filed on Dec. 23, 2011, both of which are incorporated by reference herein in their entirety.

In an aspect of some embodiments, an exemplary camera barrel mechanism is provided. The exemplary camera barrel mechanism might be configured for use in a tablet computer system 100 (e.g., a tablet system as described in the '742 Application), although other embodiments can be configured to mount a camera in other devices; the camera can be used for a variety of purposes, e.g., for video conferencing, photography, videography, etc. In an embodiment, the camera barrel mechanism may serve as a camera mount for a digital camera (i.e., an image sensor). In one aspect, the camera barrel mechanism might comprise an internal metal structure (i.e., the "suspension frame" or "suspension panel" as mentioned above) that also provides torque and suspension for the sensitive electronic camera. One aspect of this is the internal structure of the suspension frame itself; another aspect is the compliance it provides orthogonal to the structure (i.e., in a direction along the z-axis direction, as shown, e.g., in FIGS. 4-6). The second point or aspect makes the camera much more likely to survive being dropped on its face than another type of structure.

FIGS. 1-6 variously illustrate some of the features of the camera barrel mechanism for electronic devices referred to above. The skilled reader should note that the devices and systems illustrated by FIGS. 1-6 refer to examples of different embodiments that include various components, which can be considered alternatives and/or can be used in conjunction with one another in the various embodiments. In some aspects, some of the various embodiments may be the same or similar embodiment. Hence, the description herein of the illustrated devices and systems as shown in FIGS. 1-6 is provided for purposes of illustration and should not be considered to limit the scope of different embodiments.

Figure 1:
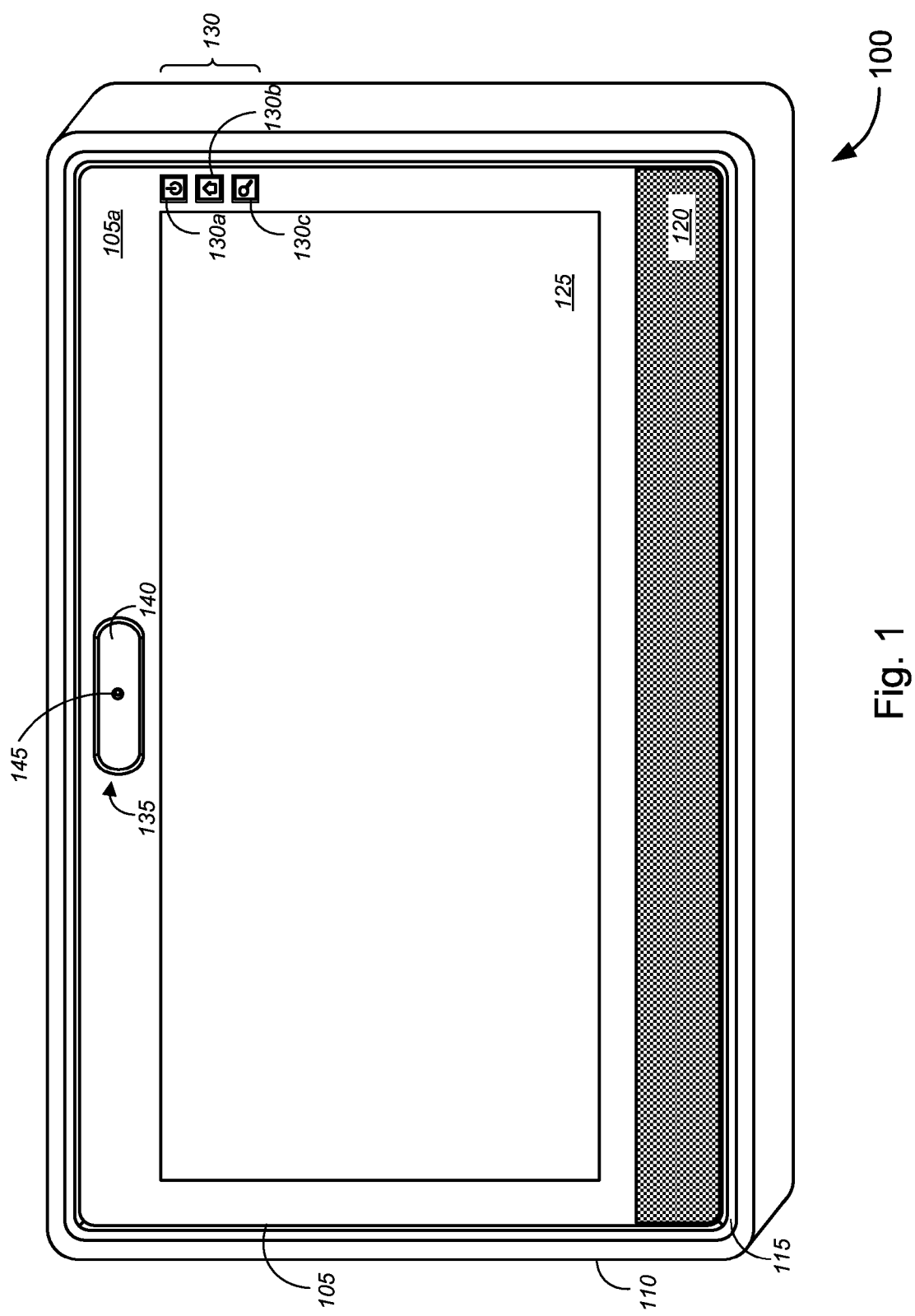
FIG. 1 is a generalized diagram illustrating a front perspective view of an example of a portable electronic device, in accordance with various embodiments.

FIG. 1 is a generalized diagram illustrating a front perspective view of an example of a portable electronic device 100, in accordance with various embodiments. In an aspect as shown in FIG. 1, electronic device 100 comprises front panel 105, housing (or rear housing) 110, molded elastomer (or overmold) 115, speaker 120, display 125, buttons 130, camera barrel mechanism 135, and camera 140. Front panel 105 may include front surface 105a—which, according to some embodiments, may include at least one or all of the speaker 120, display 125, buttons 130, camera barrel mechanism 135, or camera 140 imbedded therein and/or extending therefrom. In other words, in these embodiments, the front panel 105 may include at least one or all of the speaker 120, display 125, buttons 130, camera barrel mechanism 135, or camera 140.

One or both of housing 110 and molded elastomer 115, in some embodiments, may include an elastomeric chassis suspension system, an example of which is described in greater detail in co-pending U.S. patent application Ser. No. 13/722,896 filed on a date even herewith by Mack et al. and titled "Elastomeric Chassis Suspension for Electronic Devices" which claims priority to provisional U.S. Patent Application No. 61/579,880, filed on Dec. 23, 2011, both of which are incorporated by reference herein in their entirety. For the purposes of this document, one or both of housing 110 and molded elastomer or overmold 115 may include any type of chassis suspension system that may be mounted (by any known mechanism) between a front panel and a (rear) housing of an electronic device, where the chassis suspension system may be provided to enable protection of components on a surface and/or within an internal portion of portable electronic devices from impacts due to external forces (e.g., daily handling, drops, collisions with other objects, etc.) and/or may be provided to allow for protection of internal electronic components from liquid or particulate damage (e.g., short-circuits, abrasions, corrosions, rusting, or other damage, etc.) due to liquids or particulates intruding into the internal portion of the portable electronic devices in which the electronic components may be housed.

According to some embodiments, speaker 120 may include a speaker grill and speaker assembly (both as known to those skilled in the art). The speaker grill and speaker assembly, in some embodiments, may be attached to a chassis (not shown) of the electronic device 100. In alternative embodiments, the speaker grill and speaker assembly may be attached to front panel 105 and/or housing 110.

In some embodiments, speaker 120 may include a waterproof or water-resistant layer or coating (which might also protect against particulates and the like) therein that does not significantly negatively impact sound quality. Alternatively, the speaker components could individually be made of waterproof or water-resilient materials, and the water-proof or water-resistant layer or coating could be positioned at an interface between the speaker 120 and the front panel 105 and/or the housing 110 (depending on whether the speaker 120 abuts one or both of the front panel 105 and the housing 110).

In some embodiments, display 125 may include a touchscreen display or a non-touchscreen display. In some embodiments, display 125 may include display technologies selected from a group consisting of liquid crystal display ("LCD") technology, light emitting diode ("LED") technology, and organic light emitting diode ("OLED") technology, etc., any of which may utilize edge-lighting technology, back-lighting technology, and/or active-matrix technology. Display screen 125, according to some embodiments, may further include a glass layer selected from protective glass, high-density glass, and/or other glasses which are doped or otherwise infused with strengthening materials (as known to those skilled in the art). Protective coatings (as also known to those skilled in the art) may additionally be added to an external surface of the display screen 125.

In some embodiments, display 125 may include a waterproof or water-resistant layer or coating (which might also protect against particulates and the like) thereon that does not significantly negatively affect image display quality. Alternatively, or additionally, the water-proof or water-resistant layer or coating could be positioned at an interface between the display 125 and the front panel 105 (e.g., via an overmold structure 115 surrounding a perimeter of the display 125, e.g., as shown in FIG. 1).

Buttons 130, in some examples, may include buttons provided in front panel 105 and/or on a side or other external surface of housing 110. In some embodiments, buttons 130 may be "hard" buttons (i.e., physical buttons embedded in a surface of the front panel 105 and/or housing 110) including, but not limited to, a power button 130a, a menu or home button 130b, and a search button 130c. Other buttons—including, but not limited to, a zoom in button, a zoom out button, a back button (e.g., for web-browsing), a forward button (e.g., for web-browsing), a favorites button, volume control buttons (e.g., volume up button, volume down button, mute button, etc.), an e-mail button, multimedia control buttons (e.g., play button, pause button, media reverse button, media forward button, stop button, record button, etc.), a calculator button, an undo button, a redo button, and the like—may also be included either on the front panel 105 or on an external surface of housing 110. Buttons 130, according to some embodiments, may include at least one "soft" button (i.e., a region corresponding to a portion of an input field on a touchscreen display (such as display 125) that may usually be denoted by a graphical representation of a button, etc.), which might be configured to perform any of the functions of the "hard" buttons mentioned above. In some examples, each button 130 might have a profile shape selected from a group consisting of circle, square, rectangle, triangle, any curved shape, any polygonal shape, and any combination of these shapes, etc. Each button 130, according to some embodiments, might have a contact surface (i.e., surface on which a user's finger may make contact to actuate the button) that may be at least one of raised, recessed, flat, generally concave, generally convex, smooth, rough, soft, hard, or any combination of these characteristics.

In some embodiments, buttons 130 may include a waterproof or water-resistant layer or coating (which might also protect against particulates and the like) therein that does not significantly negatively impact actuation quality. Alternatively, the button components could individually be made of water-proof or water-resilient materials, and the water-proof or water-resistant layer or coating could be positioned at an interface between each button 130 and the front panel 105 and/or the housing 110 (depending on whether each button 130 is provided on a surface of one or both of the front panel 105 and the housing 110). In yet another alternative example, a water-proof or water-resistant layer or coating may be provided over each button 130 such that any gaps between each button 130 and the surface of the front panel 105/housing 110 may be covered by the layer or coating. In one aspect, such a coating or layer may cover a portion of the exposed surface of the front panel 105, all of the exposed surface of the front panel 105, a portion of housing 110, and/or all of the housing 110.

Camera 140 may, in some examples, comprise an aperture 145, which provides optical access to an image sensor or the like. A transparent cover (such as glass or plastic, etc.) may be provided over the aperture 145 to prevent liquids or particulates from entering and damaging the image sensor or the like. The camera barrel assembly 135 mounts the camera 140, so that an aperture 145 of the camera is aimed generally normal to a front or back face of the tablet or device 100 (i.e., generally parallel to a z-axis direction, as shown, e.g., in FIGS. 4-6), although as described in further detail below, in some embodiments, the camera barrel mechanism 135 may allow rotation of the camera 140 to allow the aperture 145 to be aimed at different vertical angles (i.e., at an angle θ, as shown in FIGS. 5-6) relative to the face (including, but not limited to, a front surface 105a of panel 105, a rear surface of housing 110, or a side surface of housing 110) of the tablet or device 100 (or more particularly, relative to an optical axis 185 of the aperture 145 of camera 140, as shown, e.g., in FIGS. 5-6). This feature can allow, for example, the camera 140 to be rotated so that the aperture 145 is aimed at the face of a person using the tablet (e.g., for videoconferencing applications) and/or relatively more upward or downward (or perhaps also side-to-side) to facilitate photography or videography.

According to some embodiments, camera 140 that is mounted on the camera barrel mechanism 135, as described in detail below, may include, but is not limited to, charge-coupled devices ("CCDs"), digital still cameras, digital video cameras, phone cameras, optical cameras, other types of semiconductor-based cameras, and/or any type of image sensor, etc. In some embodiments, the camera 140 and/or the camera barrel mechanism 135 may include a water-proof or water-resistant layer or coating therein (or on a surface thereof that may be adjacent to front surface 105a of the panel 105 that does not significantly negatively affect the quality of captured images or videos and/or does not significantly negatively affect the functionality of the camera barrel mechanism 135. Alternatively, the components of camera 140 and/or camera barrel mechanism 135 could individually be made of water-proof or water-resilient materials, and the water-proof or water-resistant layer or coating could be positioned at an interface between the camera 140/camera barrel mechanism 135 and a front panel (such as front panel 105), a rear panel, or a chassis of the electronic device 100 on which the camera barrel mechanism 135 might be mounted. Such water-proof or water-resistant layer or coating might in some cases also prevent particulates from intruding within the housing 110 via the camera/housing interface, or the like.

FIG. 2 is a rear plan view of an example of a front panel 105 of a portable electronic device 100, in accordance with various embodiments. As shown in FIG. 2, camera 140 might be mounted within camera barrel mechanism 135, which might comprise an actuator plate 150 mounted thereon via mounting tabs 150a. Also shown in FIG. 2 is a rear surface 105b of front panel 105 that might comprise buttons 130 and/or mounting structures for buttons 130, speaker components and electronics 120a (which might further include, e.g., speaker assembly and other speaker components, etc.) mounted on the rear of the grill or front panel of speaker 120, and display 125. A suspension frame or panel 155 may be mounted on the rear surface 105b via mounting screws 160 (or similar mounting mechanisms). The individual components, as well as the functionality, of various embodiments of the camera barrel mechanism 135 (and supporting structures) are described in greater detail below with respect to FIGS. 3-6.

Figure 3B:
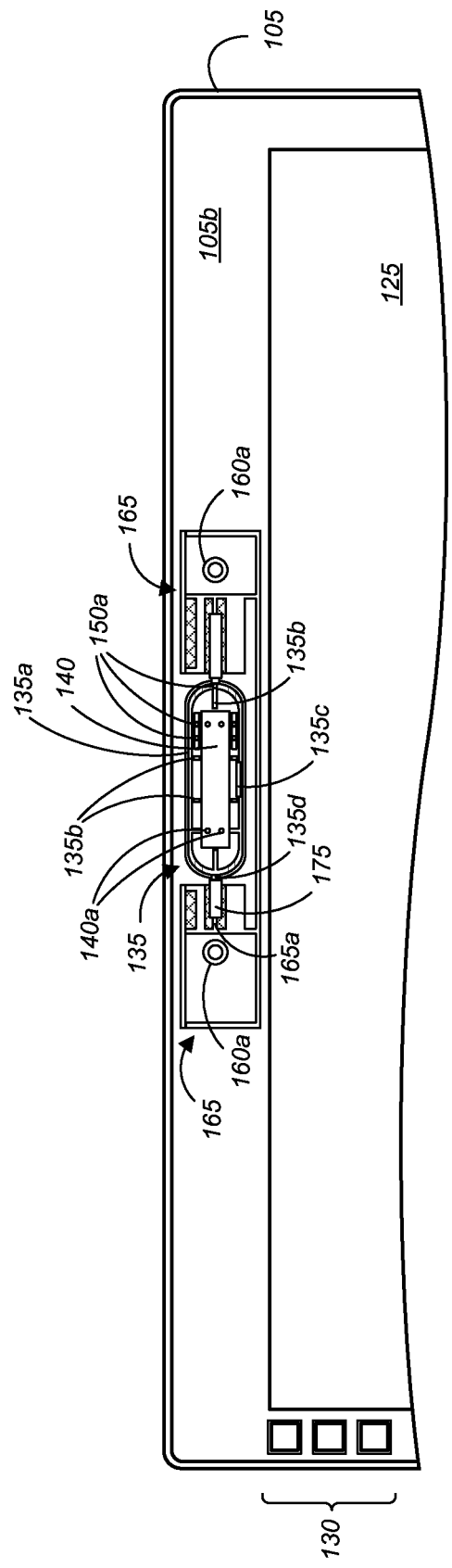
FIG. 3B is a partial rear plan view of an example of a front panel of a portable electronic device, without an actuating plate of a camera barrel mechanism and without a spring suspension panel or frame, in accordance with various embodiments.
Figure 3C:
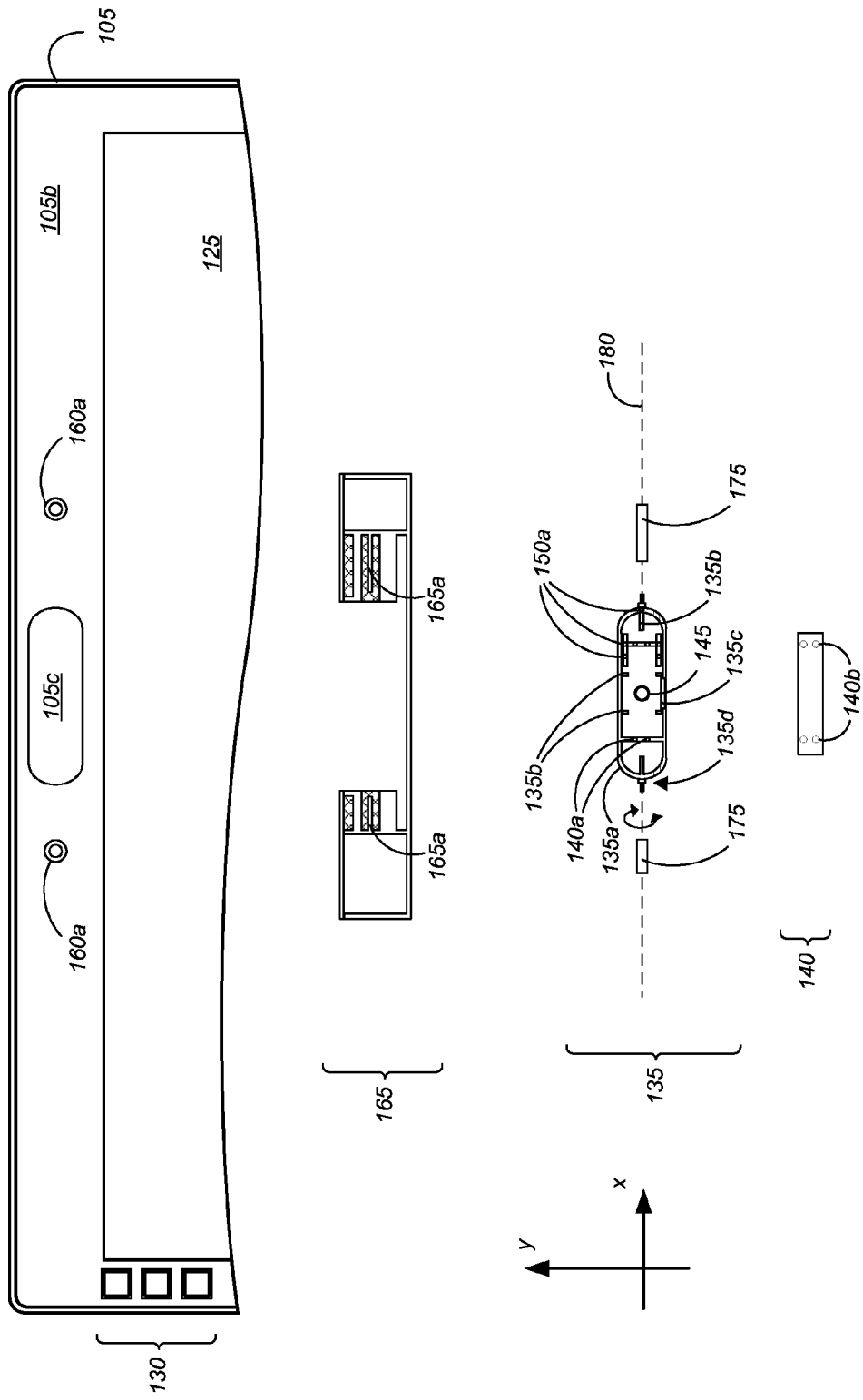
FIG. 3C is an exploded view of the components of the front panel and the camera barrel mechanism of the portable electronic device as shown in FIG. 3B, in accordance with various embodiments.

FIGS. 3A-3C show the rear portion of front panel 105 in various states of disassembly, in order to illustrate the components of the camera barrel mechanism 135. FIG. 3A is a partial rear plan view of an example of a front panel 105 of a portable electronic device 100, without an actuating plate 150 of a camera barrel mechanism 135, in accordance with various embodiments. FIG. 3B is a partial rear plan view of an example of a front panel 105 of a portable electronic device 100, without an actuating plate 150 of a camera barrel mechanism 135 and without a spring suspension panel or frame 155, in accordance with various embodiments. FIG. 3C is an exploded view of the components of the front panel 105 and the camera barrel mechanism 135 of the portable electronic device 100 as shown in FIG. 3B, in accordance with various embodiments.

As shown in FIGS. 3A-3C, the camera barrel assembly 135 might include barrel frame 135a, mounting tabs 140a (mounted within barrel frame 135a) to secure the camera 140 in the camera barrel assembly 135, and alignment tabs 135b (mounted within barrel frame 135a and) positioned on/along at least two opposing sides of camera 140 (and in some embodiments, on/along each side of camera 140) for ensuring that the camera 140 is properly aligned within barrel frame 135a. As further illustrated in the embodiment of FIG. 3C, the camera barrel assembly 135 may be rotatably mounted to a front panel 105 of the device 100, or to a rear panel or a chassis of the tablet or device 100, allowing rotation of the camera in a vertical plane relative to (the front surface 105a of panel 105, a rear panel, or a chassis, as the case may be, of) the tablet or device 100 (e.g., rotation about axis 180, which is parallel with the x-axis, where the axis 180 is normal or orthogonal to a plane defined by the y and z axes). (Of course, in other embodiments, the camera barrel assembly 105 might be mounted to the tablet chassis, the rear panel, or the front panel 105 in other fashions, e.g., to allow rotation in a horizontal plane (e.g., in the x-y plane) and/or in two dimensions relative to the tablet or device 100 (e.g., about the axis 180 and about an axis parallel with the y-axis and orthogonal to axis 180).)

In some embodiments, camera 140 might comprise an optical sensor (not shown) that is aligned with aperture 145. Camera 140, in some cases, may further comprise mounting holes 140b through which mounting tabs 140a (that may be provided along bottom portions of barrel frame 135a) might fit in order to ensure mounting and alignment of the camera 140 within barrel frame 135a of camera barrel mechanism 135.

As illustrated in FIG. 3C, barrel frame 135a of camera barrel mechanism 135, according to some embodiments, might comprise a plurality of alignment tabs 135b along at least portions of an inner perimeter thereof that may act to align and/or hold the camera 140 in position within the barrel frame 135a. As shown in the embodiment of FIG. 3C, the plurality of alignment tabs 135b might include at least two alignment tabs on opposing inner sides of barrel frame 135a, where the plurality of alignment tabs 135b may be of different heights relative to the heights of the portion of the walls of barrel frame 135a; for example, as shown in FIGS. 3-6, barrel frame 135a might have substantially straight sidewalls having a lower relative height, while at the middle of the curved sidewalls (i.e., the portion of the walls of the barrel frame 135a that align with axis 180), the height may be relatively high, with, in some cases, an intermediate height portion joining these relatively low portions of the wall to these relatively high portions of the wall. (Incidentally, for the walls of the barrel frame 135a of varying height, the relatively higher wall portions might be provided to accommodate an axle that might be aligned with axis 180, such as axle 135d, as described below, and/or to accommodate mounting of actuation plate 150 on at least one of the relatively higher wall portions via at least one mounting tab 150a, while the relatively lower wall portions might be provided to at least accommodate spring contact slot or contact cavity 135c, as also described below).

According to some embodiments, barrel frame 135a may further comprise an axle 135d on either curved sidewall thereof, where the axles 135d define the axis 180. Axles 135d, in some cases, might be fitted within corresponding apertures in mounting clips 175. Mounting clips 175, in some examples, might each comprise two sections. The first section of each mounting clip 175 might have a U-shaped cross-section or U-shaped slot that might be configured to fit over rib 165a in frame structure 165. The second section might comprise a generally solid block having a circular cross-section or circular hole through which one of the axles 135d might fit. With such structure, the mounting clips 175 may only be allowed to move along a direction that is normal to the rear surface 105b of front panel 105 (i.e., along a direction parallel to the z-axis), while ribs 165a over which the U-shaped slots of clips 175 (as well as the second section of each clip 175) might prevent lateral movement of the clips 175 (and thus of the camera barrel assembly 135) along a plane parallel to the x-y plane. In some embodiments, an interface material may be provided between the circular hole in the second section (i.e., section closest to the barrel frame 135a) of the mounting clip 175 and a corresponding one of the axles 135d in order to provide rotational friction to prevent unintended rotation of the barrel frame 135a (and thus camera 140).

In some embodiments, mounting tabs 150a may be provided, e.g., on raised portions within the barrel frame 135a (including on portions of the wall of the barrel frame 135a having a relatively larger height) for mounting actuation plate 150 (as shown, e.g., in FIG. 2).

As illustrated in FIGS. 2 and 3, the camera barrel mechanism 135 might further comprise a set of cantilever springs 170 that are formed in suspension frame 155, which is mounted to mounting wells 160a of front panel 105 via mounting screws 160. In alternative embodiments, the suspension frame 155 may be affixed to the chassis of the tablet system or device 100. In other embodiments, the suspension frame 155 may be affixed to the rear panel of the tablet system or device 100. In other embodiments, the cantilever springs 170 might be separately manufactured from, but attached to, the suspension frame. In still other cases, the cantilever springs 170 might be attached to other portions of the device chassis, front cover, back cover, or any other suitable component of the device.

Cantilever springs 170, in some embodiments, might each (or in combination, or collectively) provide a bias against the camera barrel mechanism or assembly 135, to provide rotational friction to prevent unintended rotation of the camera 110 and/or to provide a rotational return force that might return a rotated camera barrel mechanism 135 to its unrotated state/position (e.g., as shown in FIGS. 1-3). The cantilevered springs 170 may also allow for translation of the camera barrel assembly 135 (and the camera 140 mounted thereon) into the body of the tablet or device 100, which can provide protection of the camera in the event the tablet 100 or device 100 is dropped on the face of camera 140.

In embodiments where rotation is only about axis 180, the set of cantilever springs 170 might comprise at least four springs, including springs 170a-170d. First and third springs 170a and 170c, respectively, might in some examples be configured to prevent mounting clips 175 (and thus the camera barrel assembly 135 that is affixed thereto, via axle 135d) from translating too far into the body of the device 100 (i.e., too far along the negative z-axis direction, as shown, e.g., in FIGS. 4-6). For example, if the camera barrel assembly 135 is pushed into the body of the device 100 by some force (e.g., force caused by a user pushing the assembly 135 or a portion of the assembly 135 inward, etc.), springs 170a and 170c might flex against the respective connecting portions of suspension frame 155 in a rearward direction (i.e., in the negative z-axis direction toward a rear portion of the device 100), and subsequently swing back in the forward direction (i.e., in the positive z-axis direction) toward rear surface 105b of front panel 105, such that mounting clips 175 make contact with ribs 165a.

In alternative embodiments, the reverse effect may be desired. That is, the spring 170a (and perhaps also spring 170c) may be affixed to (corresponding) clip 175, such that camera barrel assembly 135 and spring 170a (and maybe also spring 170c) are in their respective stable states (i.e., with camera barrel assembly 135 flush against camera opening 105c, and with spring 170a (and maybe also 170c) unflexed and lying within a plane defined by suspension frame 155). When the device 100 is dropped on its front (i.e., with front surface 105a facing a surface (e.g., table-top, counter-top, floor, etc.) below the device 100), the fall might cause at least spring 170a (and perhaps also spring 170c) to flex in the rearward (i.e., negative z-axis direction) toward a rear portion of the device 100. In such a case, because clip 175 is affixed to the spring 170a (with the other clip 175 perhaps also affixed to spring 170c), clip(s) 175 (together with the camera barrel assembly 135 and camera 140) might move rearward together with spring 170a (and perhaps also spring 170c), and might accordingly be caused to translate inward toward an interior portion of the device 100. By such action, the camera barrel assembly 135 and the camera 140 may be protected from the initial force of impact against the surface (e.g., table-top, counter-top, floor, etc.) below the device 100. Because a front surface of camera 140 is recessed (in the z-axis direction)

with respect to front surface 105a (as shown, e.g., in FIGS. 1 and 4-6) when the clips 175 are in contact with ribs 165a, even when spring 170a (and spring 170c) returns to its unflexed position from its rearward flexing position, the ribs 165a will prevent the camera 140 from extending (in the positive z-axis direction) beyond front surface 105a. In the case that spring 170c is also affixed to the other clip 175, spring 170c and/or actuation plate 150 should be configured so that spring 170c does not interact with actuation plate 150. This is because, with spring 170c affixed to clip 175 while in its unflexed position, spring 170c cannot flex in the positive z-axis direction when actuation plate 150 rotates in the clockwise direction about axis 180 as shown, e.g., in FIG. 5, thus preventing further rotation of camera barrel assembly 135 (and thus also camera 140 mounted thereon). In such cases, it may be sufficient for spring 170c to interact with actuation plate 150, without interacting with clip 175.

Incidentally, because the camera barrel mechanism 135 is caused to move rearward with at least spring 170a, even if other springs, such as spring 170b, also flex rearward due to the falling of the device 100, said other springs might not also make contact with actuating plate 150, which may cause the camera barrel mechanism 135 to rotate about axis 180, which might result in a portion of the camera barrel assembly 135 and/or camera 140 to extend (in the z-axis direction) beyond surface 105a (through opening 105c) when at least spring 170a returns to its unflexed position. Even if some rotation of the camera barrel assembly 135 is caused by, e.g., spring 170b when the device is falling. The return force of springs 170b and especially 170d might cause camera barrel assembly 135 to rotate back to its unrotated position, by spring 170d contacting and pushing, in the z-axis direction, contact slot or contact cavity 135c, which causes opposite rotation of the assembly 135 about the axis 180. The operation of springs 170 are discussed in greater detail with respect to FIGS. 4-6 below.

According to some embodiments, second, third, and fourth springs 170b-170d might be configured to flex when the camera barrel assembly 135 is rotated in either direction about axis 180, as discussed in detail below with respect to FIGS. 4-6. As shown in FIGS. 4-6, for example, spring 170d might, in some examples, be thinner than any of springs 170a-170c. In other embodiments, spring 170d might be substantially the same thickness as spring 170b, but may be made of a material having a flexibility that is greater than (i.e., less stiff compared with) spring 170b. In any event, because spring 170d is affixed to spring 170b, spring 170d might be configured to not significantly negatively affect the flexing of spring 170b, which might negatively affect the functionality of camera barrel assembly 135. Also as shown in FIGS. 4-6, spring 170d might comprise a curved portion at an end thereof that is proximate to the barrel frame 135a, and that is positioned to make contact with contact slot or contact cavity 135c.

A camera mount, in some embodiments, might comprise a camera barrel assembly 135 and a set of cantilever springs 170. The camera barrel assembly 135 might, in some cases, be configured to have a camera 140 affixed thereto, and might be configured to be rotatably coupled with one of a front panel 105, a rear panel, or a chassis of a tablet computer system 100 or a portable electronic device 100, so that the camera 140 may be disposed with an aperture 145 of the camera 145 facing external to the tablet computer system 100 or the portable electronic device 100, and with the aperture 145 of the camera 145 generally normal to a face (such as a front surface 105a, a rear surface of housing 110, or a side surface of housing 110, etc.) of the tablet computer system 100 or the portable electronic device 100. In some embodiments, the camera barrel assembly 135 being positioned such that the aperture 145 of the camera 145 faces external to the tablet computer system 100 or the portable electronic device 100, with the aperture 145 of the camera 145 generally normal to a face of to the tablet computer system 100 or the portable electronic device 100 might define an unrotated state/position of the camera barrel assembly 135 (and thus of the camera 140).

As noted above, the set of cantilever springs 170 might, in some examples, be affixed to one of the front panel, the rear panel, or the chassis of the tablet computer system 100 or the portable electronic device 100. The set of cantilever springs 170 might be biased against the camera barrel assembly 135 to provide rotational friction on the camera barrel assembly 135. In some embodiments, the set of cantilever springs 135 might have sufficient compliance to allow the camera 140 to retract into a body of the tablet computer system 100 or the portable electronic device 100, upon encountering an external force. In some embodiments, the external force might include one of a force resulting from the portable electronic device being dropped or a force of impact to one of a face of the camera 140, a face of the camera barrel assembly 135, or a face of the tablet computer system 100 or the portable electronic device 100 (e.g., a front surface 105a, a rear (outer) surface of housing 110, or a side (outer) surface of housing 110, etc.).

According to some embodiments, retraction of the camera 140 might include at least one of rotating the camera barrel assembly 135 (and the camera 140) back to its unrotated state/position (as discussed above), translating the camera barrel assembly 135 (and the camera 140) within the body of the tablet computer system 100 or the portable electronic device 100.

Figures 6A, 6B, 6C:
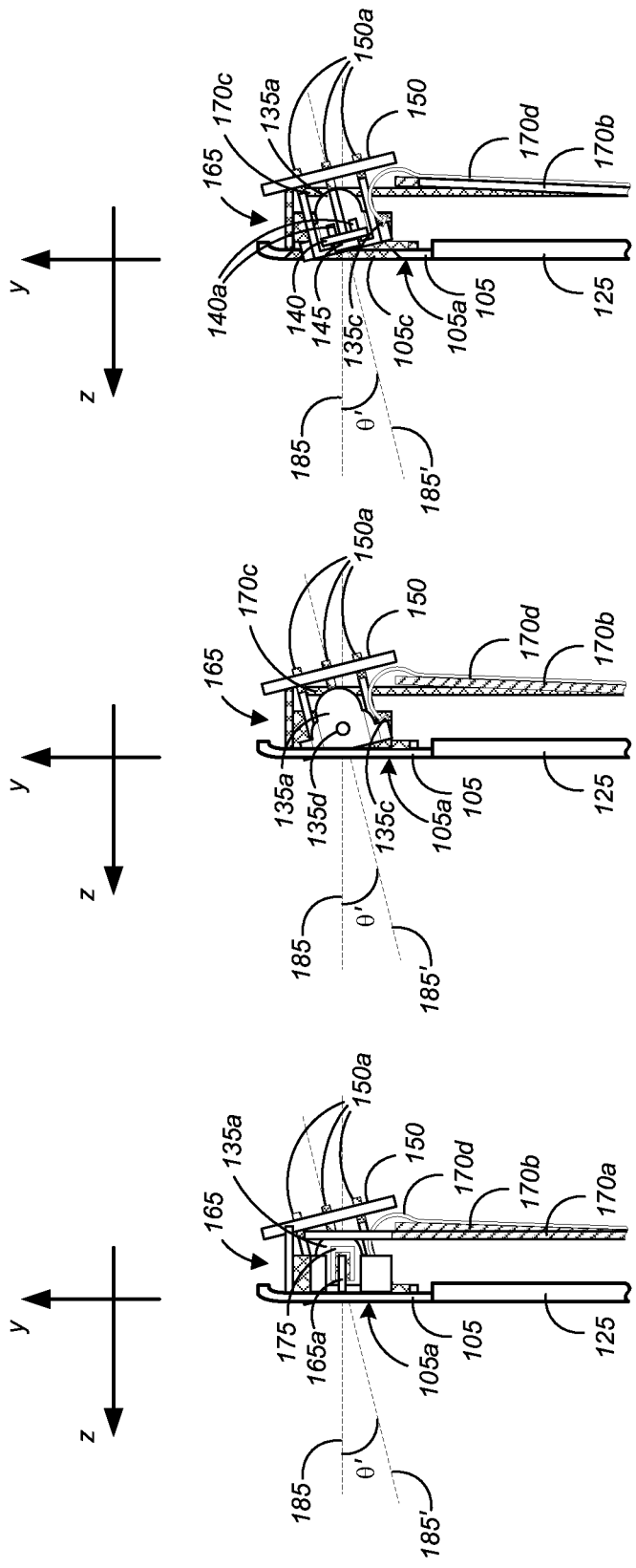

FIGS. 4-6 illustrate partial sectional views of camera barrel assembly 135 as shown, e.g., along section lines A-A, B-B, and C-C in FIG. 2. In particular, FIGS. 4A-4C are partial sectional views of an example of a camera barrel mechanism 135 that is mounted on the rear portion of a front panel 105 of a portable electronic device 100, as shown, e.g., along respective section lines A-A, B-B, and C-C in FIG. 2, in accordance with various embodiments. FIGS. 4A-4C show the camera barrel mechanism 135 in its unrotated (i.e., rest) state, in which the barrel mechanism 135 is aligned with the optical axis 185 generally normal to surface 105a. FIGS. 5A-5C and 6A-6C, on the other hand, are partial sectional views of an example of a camera barrel mechanism 135 that is rotated about axis 180 with respect to a front panel 105 of a portable electronic device 100, as shown, e.g., along respective section lines A-A, B-B, and C-C in FIG. 2, in accordance with various embodiments.

As shown in FIGS. 4A-4C, in its rest or unrotated state, camera barrel assembly 135 is aligned so that the aperture 145 of camera 140 (mounted within camera barrel assembly 135 defines a rest or unrotated optical axis 185, with aperture 145 facing external to the device and aimed generally normal to front surface 105a of device 100. In this state, cantilever springs 170 are unflexed and lie along a plane defined by suspension frame 155, said plane being parallel to the front surface 105a of front panel 105. At the same time, camera 140 and actuation plate 150 lie in respective planes that are parallel with both the front surface 105a and the plane defined by suspension frame 155.

In some embodiments, as shown, e.g., in FIG. 1, when a portion of camera 140 and/or camera barrel assembly 135 that is between aperture 145 and the closest sidewall of housing 110 is pushed from the front of the device 100 by a finger of a user (or some other tool, including, but not limited to, a stylus, pen, etc.), camera barrel assembly 135 (and thus also camera 140 mounted thereon) might be caused to rotate about axis 180 (as shown, e.g., in FIG. 3C) in a clockwise direction in the y-z plane as shown in FIG. 5, with axles 135d rotating within the circular holes of mounting clips 175, by an angle θ (which is defined by current optical axis 185' and rest/unrotated optical axis 185). Angle θ might include any angle in a range of 0° to 60° from the optical axis 185, preferably between 0 and 45° from optical axis 185. Such rotation might cause a portion of the camera 140 and/or camera barrel assembly 135 to extend in the positive z-axis direction, through opening 105c, beyond front surface 105a, thus making said portion (or portions physically connected to said portion) of camera 140 and/or camera barrel assembly 135 susceptible to damage from frontal impacts (e.g., from daily handling, drops, collisions with other objects, etc.). In some embodiments (as discussed above), interface material may be provided between each axle 135d and the circular hole of each mounting clip 175 to provide some rotational friction so that springs 170 do not inadvertently cause the camera barrel assembly 135 (and thus camera 140) to rotate back to its rest position after the user releases his or her finger (or some other tool, including, but not limited to, a stylus, pen, etc.). However, the rotational friction caused by the interface material should not be so great as to prevent springs 170 from moving the camera barrel assembly 135 (and thus camera 140) to rotate back to its rest/unrotated position after springs 170 experience an external force, e.g., caused by the device 100 falling (as discussed below).

To prevent frontal impact damage to said portion (or portions physically connected to said portion) of camera 140 and/or camera barrel assembly 135, actuation plate 150, which is mounted via mounting tabs 150a to camera barrel assembly 135, might be rotated about axis 180 by angle θ (together with assembly 135), which might cause actuation plate 150 to make contact with and push (in the positive z-axis direction) spring 170b (which would also cause spring 170d to also be actuated because spring 170d is affixed to spring 170b), as well as spring 170c, in the forward direction (i.e., along the positive z-axis direction) toward front surface 105a. Here, spring 170d must necessarily be thin enough and/or flexible enough to allow both springs 170b and 170d to freely flex. As shown in FIGS. 5A-5C, such rotation would not cause either spring 170a or portions of suspension frame 155 to move or flex.

When the device 100 is dropped, the external force caused by the fall might force at least springs 170b/170d and 170c to move rearward (i.e., in the negative z-axis direction) toward a rear portion of device 100. Such motion of the springs 170b/170d and 170c might cause actuation plate 150 (and thus camera barrel assembly 135 and camera 140) to rotate (e.g., against the rotational frictional force of the interface material, if any, provided between each axle 135d and the circular hole of each mounting clip 175) about axis 180, and eventually result in the springs 170b/170d and 170c settling in the rest or unflexed state (which would result in camera barrel assembly 135 (and camera 140)) to return to its unrotated rest state/position, which might be recessed with respect to surface 105a (e.g., as shown in FIG. 4C). As such, the camera barrel assembly 135 (and camera 140) are protected from an initial frontal impact, if any, with a surface (e.g., table-top, counter-top, floor, etc.) below the device 100 and toward which the device 100 is falling. Alternatively and/or additionally, the impact force itself might force the springs 170b/d and 170c to move rearward, allowing the camera barrel assembly 135 to retract into the device (with or without rotation) and thereby allowing the chassis of the device itself to absorb the significant proportion of the impact force.

With reference to FIG. 6, various embodiments are shown in which the camera barrel assembly 135 (and the camera 140) is rotated in a similar manner as described above with respect to FIG. 5, albeit about axis 180 (as shown, e.g., in FIG. 3C) in a counter-clockwise direction in the y-z plane as shown in FIG. 6, by an angle θ' (which is also defined by current optical axis 185' and rest/unrotated optical axis 185). In this case, the user might push from the front of the device 100 (using his or her finger, or using some other tool, including, but not limited to, a stylus, pen, etc.) a portion of camera 140 and/or camera barrel assembly 135 that is between aperture 145 and the display 125. Angle θ' might include any angle in a range of 0° to 60° from the optical axis 185, and perhaps between 0 and 45° from optical axis 185. The combined angle θ plus θ' might include a field of view of about 120°.

As with the clockwise rotation in the y-z plane as discussed above with respect to FIG. 5, such counter-clockwise rotation in the y-z plane might cause a portion of the camera 140 and/or camera barrel assembly 135 to extend in the positive z-axis direction, through opening 105c, beyond front surface 105a, thus making said portion (or portions physically connected to said portion) of camera 140 and/or camera barrel assembly 135 susceptible to damage from frontal impacts (e.g., from daily handling, drops, collisions with other objects, etc.).

To prevent frontal impact damage to said portion (or portions physically connected to said portion) of camera 140 and/or camera barrel assembly 135, spring contact slot or contact cavity 135c, which is mounted on a sidewall of barrel frame 135a that is closest to the cantilever springs 170 (or closest to display 125), might be rotated about axis 180 by angle θ' (together with assembly 135), which might cause contact slot or contact cavity 135c to make contact with and push (in the negative z-axis direction) spring 170d (and also spring 170b to which spring 170d is affixed) in the rearward direction (i.e., along the negative z-axis direction) toward a rear portion of device 100. Here, as above, spring 170d must necessarily be thin enough and/or flexible enough to allow both springs 170b and 170d to flex. As shown in FIGS. 6A-6C, such rotation would not cause any of spring 170a, spring 170c, or portions of suspension frame 155 to move or flex.

When the device 100 is dropped, for example, the external force caused by the fall (and/or the resulting impact) might force at least springs 170b and 170d to move forward (i.e., in the positive z-axis direction) toward a surface 105a of device 100. In some cases, at least springs 170b and 170d might first be caused to move further rearward, and then forward due to the spring force of at least springs 170b and 170d. Such forward motion of the springs 170b and 170d might cause contact slot or contact cavity 135c (and thus camera barrel assembly 135 and camera 140) to rotate (e.g., against the rotational frictional force of the interface material, if any, provided between each axle 135d and the circular hole of each mounting clip 175) about axis 180, and eventually result in the springs 170b and 170d settling in the rest or unflexed state, which might result in camera barrel assembly 135 (and camera 140) returning to its unrotated rest state/position, which is recessed with respect to surface 105a (e.g., as shown in FIG. 4C). As such, the camera barrel assembly 135 (and camera 140) are protected from an initial frontal impact, if any, with a surface (e.g., table-top, counter-top, floor, etc.) below the device 100 and toward which the device 100 is falling.

In some embodiments, the fall might cause springs 170 to flex forward and rearward multiple times with respect to suspension frame 155 (as shown, e.g., in both FIGS. 5 and 6), such as to cause oscillating rotations in the clockwise and counter-clockwise directions in the y-z plane as shown in FIGS. 5 and 6 by angles θ and θ'. In such a case, the returning force of each of springs 170b, 170c, and 170d might gradually settle to its rest or unflexed state, which might result in camera barrel assembly 135 (and camera 140) gradually returning to its unrotated rest state/position.

Although the above embodiments are described (and FIGS. 1-6 are shown) in terms of a single axis rotation about axis 180, which is parallel to the x-axis, the various embodiments are not so limited. For example, some embodiments (not shown) might comprise a camera barrel assembly 135 that comprises structure for rotation about axis 180, as well as about an axis that is orthogonal to axis 180 (i.e., parallel to the y-axis). Such structure might, in some cases, include a two-axis gimbal structure, wherein the barrel frame 135a (as described above, and shown with respect to FIGS. 2-6) might be incorporated into the gimbal structure. In some embodiments, rather than an elongated barrel frame or elongated gimbal structure, a circular configuration may be implemented, which might allow for symmetry about both axis 180 and the axis orthogonal thereto. For the gimbal structure, additional cantilever springs might be provided to allow a rotational return force against the camera barrel assembly 135 about the axis orthogonal to axis 180, in a similar manner as described above with respect to the rotational return force about axis 180 (see above with respect to FIGS. 5-6).

In some examples, camera barrel assembly 135 might be shortened along the x-axis direction, with springs 170b and 170d being reduced in width accordingly, with clips 175 and/or ribs 165a (and corresponding portions of mounting frame 165) extended inward toward camera barrel assembly 135, but with springs 170a and 170c unchanged. Additional cantilever springs may be provided that have an L-shaped profile that might generally extend in the y-axis direction, generally parallel to springs 170a-170d, between springs 170a and 170b and between springs 170b and 170d. The shorter portions of the L-shape of these additional cantilever springs (which may be additionally reinforced with a more rigid material) might extend inward toward the axis orthogonal to axis 180, such as to be positioned below a secondary actuation plate (similar to actuation plate 150, which in such examples, may be reduced in size to not interfere with the secondary actuation plate). In alternative embodiments, the additional cantilever springs might each have a straight profile (rather than an L-shaped profile), and might extend from a side of the suspension frame 155 (which might be close to mounting screws of the suspension panel, such as mounting screws 160 as shown, e.g., in FIG. 3A), where said side is orthogonal to a side from which springs 170a-170d extend. Rotation of camera barrel assembly 135 about the orthogonal axis might cause the secondary actuation plate to cause one of the two additional cantilever springs to flex forward. Dropping of the device 100 may cause the additional cantilever springs to flex rearward, thus causing the secondary actuation plate to rotate back. In some cases, oscillations in opposing rotations about the orthogonal axis may occur, in which case, each additional cantilever spring might eventually cause the secondary actuation plate (and thus camera barrel assembly 135 and camera 140) to return to its rest or un-rotated state/position.

According to some embodiments, motors (e.g., stepper motors or servo motors, etc.) may be provided on mounting clips 175 and configured to rotate the camera barrel assembly 135, by rotating axle 135d. In the case of two-axis rotation, motors (e.g., stepper motors or servo motors, etc.) may additionally or alternatively be provided on rotational axial components of the gimbal to allow for motorized rotation about the axis 180 and about the axis orthogonal to axis 180 (i.e., the orthogonal axis). In such examples, electrical control of the motors may be provided by a control module provided with the device 100 (perhaps on a chassis thereof), with computerized control of the control module via software installed in a memory of the device 100 and executed on a processor of the device 100, as understood by those skilled in the art. In some embodiments, the control module, the memory, and the processor may be operatively coupled with each other (perhaps via a bus line), and each may be mounted on the chassis of the device 100. The control module, in some cases, may be operatively coupled via lead lines (for example) to each motor that is configured to rotate the camera barrel assembly 135.

Although the embodiments described above with respect to FIGS. 1-6 are directed to a camera (such as camera 140) and a camera barrel assembly (such as camera barrel assembly 135) that are mounted to a front panel 105 of device 100, the various embodiments are not so limited. For example, the camera 140 (such as camera 140) and the camera barrel assembly (such as camera barrel assembly 135) may be mounted to a chassis. In some embodiments, portions of suspension frame 155 may also serve as a chassis. In other embodiments, a chassis that is separate from suspension frame 155 may be provided within device 100.

Alternatively, or in addition, a camera and camera barrel assembly may be mounted on a rear panel of the device 100, such that the camera may point generally normal to a surface on the opposite side of the device 100 with respect to surface 105a of front panel 105. In this manner, the device 100 (such as a tablet computer, a mobile phone, a smartphone, or other portable electronic device, etc.) may be used to capture still images/photographs and/or videos of objects or scenes in front of a user, with the rear panel of device 100 pointing in front of the user, while allowing the user to view the captured still images and/or videos on display 125 on the front panel.

In some embodiments, a first camera and first camera barrel assembly may be mounted on the front panel (as described, and shown above, with respect to FIGS. 1-6), while a second camera and second camera barrel assembly may be mounted on the rear panel (similar to mounting of the first camera and first camera barrel assembly). Motors may be provided (as discussed above) to enable motorized rotation of at least one of the first and second camera barrel assemblies (and corresponding the first and/or second cameras mounted thereon) about at least one of a primary axis (such as axis 180 in FIG. 3C) or a secondary axis (such as an axis orthogonal to axis 180).

In alternative embodiments, the first and second camera barrel assemblies (and the respective first and second cameras) may be mounted on the same chassis within device 100. The chassis may include one of a front suspension frame, a rear suspension frame, or a chassis structure separate from either the front or rear suspension frame. In some cases, the front and rear suspension frames may be the same suspension frame; in such cases, the first/front camera barrel assembly (including corresponding cantilever springs) and the second/rear camera barrel assembly (including corresponding cantilever springs) may be offset with each other (e.g., on different ends of a same side of the device 100, on different adjacent sides of the device 100, or on different opposing sides of the device 100), such that the two camera barrel assemblies and/or their corresponding cantilever springs do not interfere with each other.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A portable electronic device comprising:
   a camera mount comprising:
      a camera barrel assembly configured to have a camera affixed thereto, the camera barrel assembly being rotatably coupled with one of a front panel, a rear panel, or a chassis of an enclosure so that the camera is disposed with an aperture facing external to the enclosure; and
      a set of cantilever springs affixed to one of the front panel, the rear panel, or the chassis of the portable electronic device and biased against the camera barrel assembly,
   wherein in an unrotated state, the camera barrel assembly is aligned so that the camera is disposed with an aperture of the camera facing external to the portable electronic device and generally normal to a face of the portable electronic device,
   wherein the set of cantilever springs is biased against the camera barrel assembly to provide rotational friction on the camera barrel assembly, the set of cantilever springs having sufficient compliance to allow the camera to retract into a body of the portable electronic device upon encountering an external force,
   wherein the set of cantilever springs, when unflexed, lies within a first plane that is parallel to the face of the portable electronic device, said first plane being positioned at a first distance from the face of the portable electronic device, wherein the camera barrel assembly comprises at least one actuation plate mounted to the camera barrel assembly via a plurality of mounting tabs, such that, in the unrotated state, the at least one actuation plate lies in a second plane that is parallel with the face of the portable electronic device, said second plane being positioned at a second distance from the face of the portable electronic device, said second distance being greater than said first distance.

2. The portable electronic device of claim 1, wherein the external force includes one of a force resulting from the portable electronic device being dropped or a force of impact to one of a face of the camera, a face of the camera barrel assembly, or a face of the portable electronic device.

3. The portable electronic device of claim 1, wherein the set of cantilever springs having sufficient compliance to allow the camera to retract into a body of the portable electronic device includes one or more cantilever springs of the set of cantilever springs having sufficient compliance to rotate the camera barrel assembly and the camera to the unrotated state of the camera barrel assembly.

4. The portable electronic device of claim 1, wherein the set of cantilever springs having sufficient compliance to allow the camera to retract into a body of the portable electronic device includes one or more cantilever springs of the set of cantilever springs having sufficient compliance to translate the camera barrel assembly and the camera to a position within the body of the portable electronic device.

5. The portable electronic device of claim 1, wherein the camera barrel assembly is rotatable about a first axis to at least one of a first rotated state by a first angle or a second rotated state by a second angle.

6. The portable electronic device of claim 5, wherein when the camera barrel assembly is rotated to the first rotated state by the first angle, at least a first spring of the set of cantilever springs is positionally configured to make contact with a first actuation plate of the at least one actuation plate, such that the first actuation plate causes at least the first spring to flex.

7. The portable electronic device of claim 6, wherein upon encountering the external force, at least the first spring is configured to return to its unflexed position, which causes the first actuation plate to rotate the camera barrel assembly to its unrotated state.

8. The portable electronic device of claim 5, wherein when the camera barrel assembly is rotated to the second rotated state by the second angle, at least a second spring of the set of cantilever springs is positionally configured to make contact with a contact cavity of the camera barrel assembly, such that the contact cavity causes at least the second spring to flex, said second spring having a flat portion and a curved portion extending from one end of a flat portion of the second spring toward the contact cavity, which is positioned between a front face of the camera barrel assembly and the set of cantilever springs, wherein the flat portion lies in one of the first plane or a third plane adjacent to the first plane.

9. The portable electronic device of claim 8, wherein upon encountering the external force, at least the second spring is configured to return to its unflexed position, which causes the contact cavity to rotate the camera barrel assembly to its unrotated state.

10. The portable electronic device of claim 5, wherein the camera barrel assembly further comprises a gimbal structure configured to rotate about the first axis and to rotate about a second axis to at least one of a third rotated state by a third angle or a fourth rotated state by a fourth angle, said second axis being orthogonal to the first axis.

11. The portable electronic device of claim 10, wherein when the camera barrel assembly is rotated to one of the third rotated state by the third angle or the fourth rotated state by the fourth angle, at least one of a third spring or a fourth spring of the set of cantilever springs is positionally configured to make contact with a second of the at least one actuation plate, such that the second plate causes the at least one of the third spring or the fourth spring to flex.

12. The portable electronic device of claim 11, wherein upon encountering the external force, the at least one of the third spring or the fourth spring is configured to return to its unflexed position, which causes the second actuation plate to rotate the camera barrel assembly to its unrotated state.

13. The portable electronic device of claim 10, wherein the camera mount further comprises at least one motor coupled to the gimbal structure, the at least one motor being configured to provide motorized rotation of the camera barrel assembly about at least one of the first and second axes.

14. The portable electronic device of claim 1, wherein, in the unrotated state, a front face of the camera barrel assembly is recessed with respect to the face of the portable electronic device, and wherein, when in a rotated state, a portion of the front face of the camera barrel assembly extends beyond the face of the portable electronic device.

15. A method comprising:

providing a camera mount within a portable electronic device, the camera mount comprising:

a camera barrel assembly configured to have a camera affixed thereto, the camera barrel assembly being rotatably coupled with one of a front panel, a rear panel, or a chassis of the portable electronic device, wherein in an unrotated state, the camera barrel assembly is rotated so that the camera is disposed with an aperture of the camera facing external to the portable electronic device and generally normal to a face of the portable electronic device; and a set of cantilever springs affixed to one of the front panel, the rear panel, or the chassis of the portable electronic device and biased against the camera barrel assembly to provide rotational friction on the camera barrel assembly, the set of cantilever springs having sufficient compliance to allow the camera to retract into a body of the portable electronic device upon encountering an external force, wherein the external force includes one of a force resulting from the portable electronic device being dropped or a force of impact to one of a face of the camera, a face of the camera barrel assembly, or a face of the portable electronic device;

flexing, in response to encountering the external force, at least one spring of the set of cantilever springs from a flexed state to an unflexed state; and rotating, in response to flexing the at least one spring of the set of cantilever springs from the flexed state to the unflexed state, the camera barrel assembly about at least one of a first axis and a second axis from a rotated state to the unrotated state, said second axis being orthogonal to the first axis.

16. The method of claim 15, further comprising:

rotating the camera barrel assembly from the unrotated state to the rotated state, about the at least one of the first axis and the second axis; and flexing, in response to rotating the camera barrel assembly from the unrotated state to the rotated state, the at least one spring of the set of cantilever springs from the unflexed state to the flexed state.

17. A camera mount, comprising:

a camera barrel assembly configured to have a camera affixed thereto, the camera barrel assembly being rotatably coupled with one of a front panel, a rear panel, or a chassis of an enclosure so that the camera is disposed with an aperture facing external to the enclosure; and a set of cantilever springs affixed to the chassis of the enclosure and biased against the camera barrel assembly, wherein in an unrotated state, the camera barrel assembly is aligned so that the camera is disposed with an aperture of the camera facing external to the enclosure and generally normal to a face of the enclosure, wherein the set of cantilever springs is biased against the camera barrel assembly to provide rotational friction on the camera barrel assembly, the set of cantilever springs having sufficient compliance to allow the camera to retract into a body of the enclosure upon encountering an external force, wherein the set of cantilever springs, when unflexed, lies within a first plane that is parallel to the face of the enclosure, said first plane being positioned at a first distance from the face of the enclosure, wherein the camera barrel assembly comprises at least one actuation plate mounted to the camera barrel assembly via a plurality of mounting tabs, such that, in the unrotated state, the at least one actuation plate lies in a second plane that is parallel with the face of the enclosure, said second plane being positioned at a second distance from the face of the enclosure, said second distance being greater than said first distance.

* * * * *